(12) United States Patent
Cohen et al.

(10) Patent No.: US 12,355,810 B2
(45) Date of Patent: Jul. 8, 2025

(54) PHISHING DETECTION AND TARGETED REMEDIATION SYSTEM AND METHOD

(71) Applicant: Corelogic Solutions, LLC, Irvine, CA (US)

(72) Inventors: Matthew David Cohen, Irvine, CA (US); Daniel W. Ray, Irvine, CA (US); Paul S. Hethmon, Irvine, CA (US)

(73) Assignee: CORELOGIC SOLUTIONS, LLC, Irvine, CA (US)

( * ) Notice: Subject to any disclaimer, the term of this patent is extended or adjusted under 35 U.S.C. 154(b) by 0 days.

(21) Appl. No.: 16/516,727

(22) Filed: Jul. 19, 2019

(65) Prior Publication Data

US 2020/0028876 A1    Jan. 23, 2020

Related U.S. Application Data

(60) Provisional application No. 62/701,343, filed on Jul. 20, 2018.

(51) Int. Cl.
*H04L 9/40* (2022.01)

(52) U.S. Cl.
CPC ...... *H04L 63/1483* (2013.01); *H04L 63/1416* (2013.01); *H04L 63/1425* (2013.01)

(58) Field of Classification Search
CPC . H04L 63/1483; H04L 63/1441; H04L 63/14; H04L 63/1416; H04L 63/1425; G06F 21/50
See application file for complete search history.

(56) References Cited

U.S. PATENT DOCUMENTS

| | | | |
|---|---|---|---|
| 10,796,312 B2* | 10/2020 | Bull | G06Q 20/4016 |
| 2014/0173726 A1* | 6/2014 | Varenhorst | H04L 63/1483 726/22 |
| 2016/0277439 A1* | 9/2016 | Rotter | H04W 12/06 |
| 2016/0330220 A1* | 11/2016 | Dulkin | H04L 63/1408 |
| 2018/0027006 A1* | 1/2018 | Zimmermann | G06F 9/46 726/11 |
| 2019/0259021 A1* | 8/2019 | Lu | G06Q 20/3223 |

* cited by examiner

*Primary Examiner* — Kito R Robinson
*Assistant Examiner* — Roy Rhee
(74) *Attorney, Agent, or Firm* — XSENSUS LLP (57) ABSTRACT

A system and method exploit information gained by observing abnormal commonality factors from multiple accounts over a predetermined time frame. The presence of an abnormal commonality factor serves as an indication that a group of accounts may have been compromised by a common actor via information gained by successful phishing of multiple users' information to improperly gain access to their respective accounts. Once this commonality associated with phishing is detected, the system provides a mechanism and process to rapidly respond to the phishing-originated attack to minimize information security damage to the affected accounts.

19 Claims, 6 Drawing Sheets

PHISHING DETECTION AND TARGETED REMEDIATION SYSTEM AND METHOD

BACKGROUND

Technical Field

The present disclosure generally relates to the field of identifying user logon credentials that are being used by an unauthorized third party to improperly gain access to a group of other users' online accounts.

Description of the Related Art

Online software users frequently receive phishing emails, which have the goal of capturing login credentials, which can lead to a breach of security and privacy, as well as financial fraud. As an example, real estate professionals may receive phishing emails which link to a duplicate of a particular Multiple Listing Service (MLS) login page. These phishing e-mails dupe users into entering their credentials into the hacker's site, and those credentials can then be used to access the MLS, as well as any site connected via single sign on (SSO) and any site where users used those same credentials. This could, for instance, result in the compromise of document and transaction management systems, forms, and email, all of which could contain the most sensitive information the real estate industry manages, such as social security numbers and financial account information.

SUMMARY

According to an aspect of the present disclosure, the present system and method exploits information gained by observing abnormal commonality factors from multiple accounts over a predetermined time frame. The presence of an abnormal commonality factor serves as an indication that a group of accounts may have been compromised by a common actor via information gained by successful phishing of multiple users' information to improperly gain access to their respective accounts. Once this commonality associated with phishing is detected, the system provides a mechanism and process to rapidly respond to the phishing-originated attack to minimize information security damage to the effected accounts.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION

As used herein, an element or step recited in the singular and proceeded with the word "a" or "an" should be understood as not excluding plural elements or steps, unless such exclusion is explicitly recited. Furthermore, references to "one embodiment" of the present invention are not intended to be interpreted as excluding the existence of additional embodiments that also incorporate the recited features.

The methods and systems described herein may be implemented using a computer programmed to perform operations described herein, where the programming of the computer may be via software instructions executed on a processor, firmware, hardware or any combination or subset thereof, wherein the technical effects may include at least one of: a) preventing a perpetrator of a phishing attack from benefiting from the fruits of their attack by improving the security of a computer system by preventing malicious code, instructions, or messages from allowing an unauthorized user gain access to a plurality of user accounts; b) improving the response time of a computer-based authentication system to prohibit unauthorized access to accounts, and changes to user profiles from unauthorized computer devices that are not associated with the true owner of an account; c) improve the speed at which a process or can detect unauthorized access attempts to multiple accounts by reducing the number of computer steps required to detect a number of accounts affected by phishing attacks by detecting commonalities between the attacks on multiple accounts; and improve the user experience of account holders who are unaffected by a phishing attack on other accounts, by not compelling the unaffected users to change their logon credentials in response to other users whose accounts have been compromised.

As recognized by the present inventor, the current state of phishing detection and response, in general, is suboptimal because it attempts to detect account that are compromised on an individual basis. For example, once an end-user notices that a login page in a phishing email is not a correct URL and reports it, the only option at that point is send out an email to subscribers informing them of the phishing scam. While it is feasible to attempt to have the spoofed login page taken down, this solution requires that a cooperative web host be involved. Even those these actions may be taken, there is no way for the provider to learn which accounts had been compromised and what actions would be needed remediate those accounts—other than watch for risky logins once they had taken place.

Before turning to the figures, a description of the challenges presented by a phishing attack presents for a system with multiple users, but also how the present inventor envision the "opportunity" presented by a pattern of changes, or attempted changes, to a plurality of accounts. Moreover, this pattern of changes suggested to the inventor that the uncharacteristic changes were unlikely from unassociated, legitimate users, but much more likely from a unauthorized actor who was in the process of gaining access to multiple accounts for which he from a common source, but not an authorized agent of the account holders.

Detection

Online systems can be improved with a "Fast Phishing Response" set of features that makes it easier to detect that phishing is taking place, identify accounts that may be compromised, block phisher attempts to log in without affecting legitimate users significantly, and alert affected users so that they can take steps to change their password on all sites where it is in use.

As recognized by the present inventor, if the phishers do not attempt to leverage image resources hosted by a service provider (e.g., Corelogic) in the creation of their spoofed website, and if they do not attempt to proxy requests to a login page hosted by the service provider, and if they do not attempt to log in via that access page, and only use captured credentials to access systems directly—basically, if they do not interact with the protected access page in any way—then these features will not be triggered. But, if they do any of the above, then this feature will provide the response that any authentication system should have.

Detection of Phishing Activity via Detection of Unusual Commonality

Users typically log in from IP addresses, or at least IP address ranges, ISPs, geographies, and devices that they have previously logged in from. Typical security systems look for unusual activity at the level of an individual account. Potential phishing activity can be detected by looking at those elements across multiple accounts' logins to search for commonality where there should be none.

For example, where typically accounts do not share an IP address, device fingerprint or other element as listed above, if in the course of a day or multiple days, more than one account was graded "risky", each because they logged in from a far-off geography or from a data center IP address where there should be no interactive logins—and all accounts had the same IP address, device fingerprint, or other element as listed above in common, it could be surmised that phishing is taking place. Some example scenarios where commonality can be surmised included: (a) several accounts deemed risky because users that normally do not log in from a common IP address, location or computer are in a training room or some other type of event with a shared external IP address and/or identically configured computers, it might surmise that the commonality is not due to phishing.

Regarding the flagging of suspect accounts, the accounts with these commonalities could be marked as "phished" in relation to a specific phishing incident, and that commonality (or group of commonalities) black-listed and immediately recognized during login attempt. Note that in order for this to be part of a "fast" response, account risk and correlation of factors across multiple account logins should be evaluated more than once a day, ideally close to real-time.

The Determination of Potential Phishing via Use of a Risk Score

The present system identifies phishing via detecting unlikely commonalities across accounts, as previously described but balances aggressiveness of detection with reduction of false positives by use of a "phishing risk score". Each factor described above is assigned a value. Unexpected (non-historical) similarities across accounts has a positive value. For example, use of the same ISP or browser where there was no historical similarity between accounts adds somewhat to a risk score, while use of the system by multiple accounts from a remote geography from where the system is typically used adds a larger figure. Certain differences between accounts has a negative value, such as use of different browsers subtracts a small amount from a risk score (browsers can be easily faked) while use of unique biometrics associated with a particular account subtracts substantially from a risk score. The sum of these values, modified by a multiplier based on the number of accounts where unlikely similarity was detected, corresponds with the "phishing risk score". If account risk scores exceed a particular value, it is assessed that the accounts have been compromised. The system can be configured so some customers can set the "not to exceed" value differently—reflecting their desire for aggressiveness of detection with reduction of false positives as previously mentioned.

Detect Phishing Activity via Common Referrer

Some phishers will actually have their spoof website send login requests to the legitimate servers; that case is handled above by looking for an IP address in common. Others will capture credentials for later use without checking to see if the credentials are valid and not interact with the authentication servers. But, sometimes the phishing spoof site will then forward the end users to the real server. If a common, non-white-listed referrer, is observed, administrators are alerted of this new referrer so it can be either white listed or marked as a phishing website and the account marked as "phished".

Detect Phishing Activity by Forcing Common Proxy

A common anti-phishing mechanisms in common use is to present the user with a set of images, of one which they have previously selected as "theirs". There are a few flaws with this approach: first, infrequent users do not always remember their image and it causes a support issue. Second, the phishing site will proxy the call and response between end users and the real server to both present the images and capture which is selected. So, while this mechanism does not stop phishing, it could force the phishing server to interact with the service provider's server—especially if the images were presented as a second step and were unique to the user (e.g. "Which of these properties were you involve in the sale of? Select an image or "none of these.") Detection could then be achieved through proxy requests from a phishing website as a commonality across multiple accounts as previously described. Note that once an image was phished, it would not be appropriate for use for authentication.

Response

Alert Administrators: When a suspicious commonality has been found and accounts marked as suspected of phishing, administrators should be alerted via email and/or text message with appropriate deep links so once the administrator is logged in, they are taken to the appropriate spot in the system to observe the activity.

Response: Incident/Whitelist/Blacklist Management: Mark suspicious commonalities as "white list" (system ignores from now on in evaluating phishing) or "black list". Group the commonalities into an "incident" and associate with a group incident label. Subsequently, the activities of the grouped accounts will be logged. Also, if there are commonalities (such as geo location to suspicious countries, such as a foreign country for a United States-based service) automatically "black list" the users because the commonality points to a problematic profile feature for the group of accounts.

Response: Alert Affected Accounts: When a group of compromised accounts has been detected, the specific account owners are messages with something like "You may have been phished" so they can take appropriate action.

Response: Require step-up authentication and password change for affected accounts: Accounts deemed phished may require step-up authentication until their password is changed. In this situation it is best not to use e-mail, as email may have been compromised if the user re-used credentials for multiple accounts.

The present disclosure may be embodied as a system, a method, and/or a computer program product. The computer program product may include a computer readable storage medium on which computer readable program instructions are recorded that may cause one or more processors to carry out aspects of the embodiment.

Figure 1:
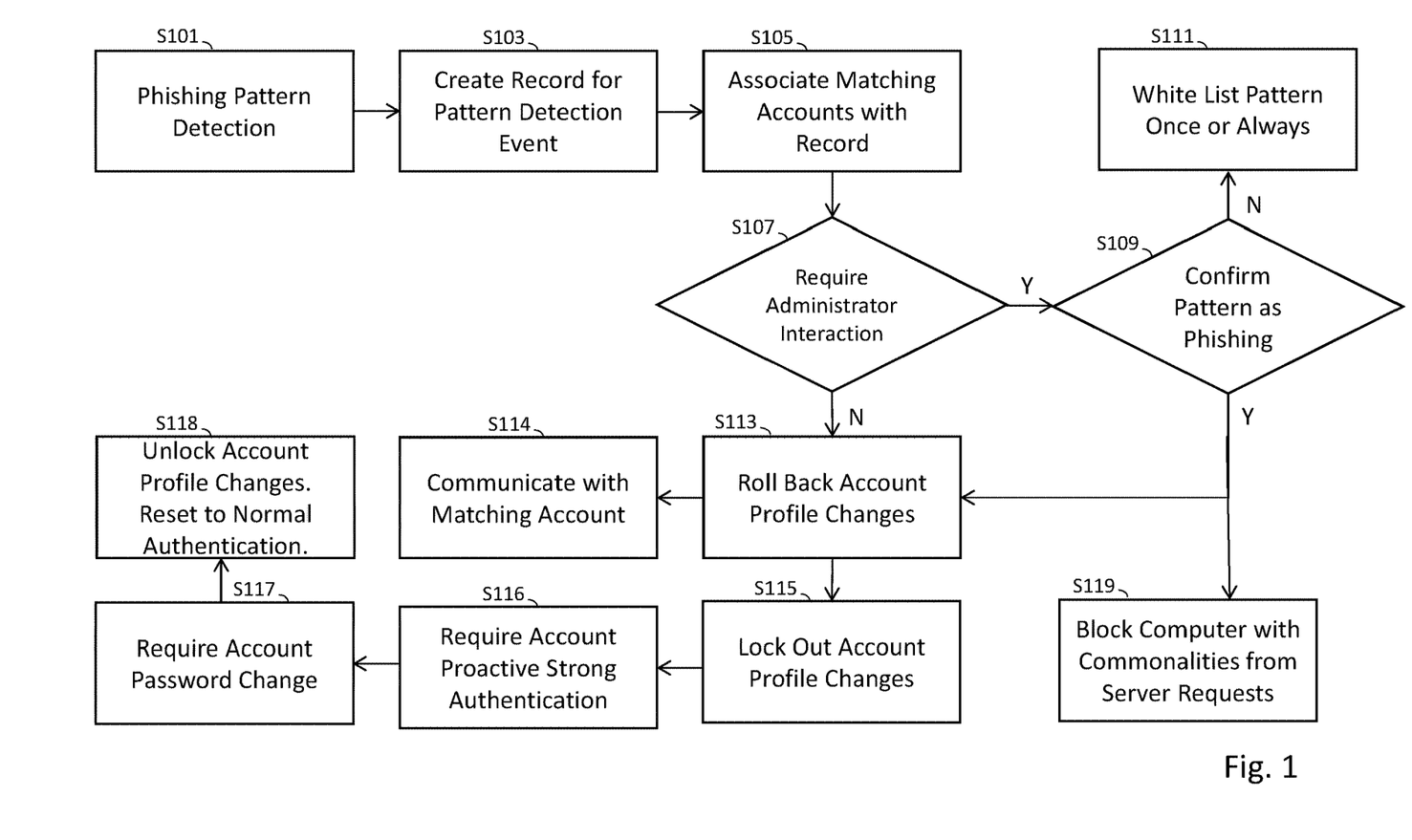
FIG. 1 is a flow diagram showing an embodiment of a process according to the present disclosure.

Referring now to the drawings, wherein like reference numerals designate identical or corresponding parts throughout the several views, FIG. 1 illustrates a flowchart of a main process performed on a computer according to the present disclosure. The process begins in step S101, where the computer 805 (FIG. 7) determines that more than one account appears to have been compromised as a result of abnormal behavior being observed relative to past activity on the account. Examples of the abnormal behavior will be discussed in more detail with respect to FIGS. 2 and 5. The process then proceeds to step S103 where a record for a pattern detection event is stored in non-transitory memory. Once again, further details of the pattern detection are provided with regard to FIGS. 2 and 5. In this context, the term "pattern" refers to a commonality of a log-on attribute for more than one account. Typical log-on attributes that are observed by the computer 805 include IP address range, ISP, geography, device fingerprint, behavioral biometric signature, and referring website.

After the record of the pattern detection is made in step S103, the process proceeds to step S105 where the computer 805 is programmed to associate which accounts are affected by the detected pattern of logon activity, and then retrieve the fields that describe those accounts. The process then proceeds to step S107, where a query is made whether administrator interaction is required. The query is made using a rule that associates a certain type of account (e.g., one that has a guarantee of early personal notification upon a potential account being compromised), and if the response to the query is affirmative, the process proceeds to step S109 where a second query is made requiring the administrator to confirm whether the pattern is a result of a phishing attack. This confirmation can be done by a computer identifying whether there are reports of potential phishing attacks on a particular account or accounts. If the response is negative in step S109, the process proceeds to step S111, where the pattern is identified as not being a threat to account integrity, and therefore whitelisted once or always (administrator selectable).

In one embodiment, if the response to the query in step S109 is affirmative, the process proceeds in parallel to step S119 and the remediation steps S113-S118. In step S119, the system blocks the computer that exhibits the commonalities from making server requests. As a result of step S119, attempts to access the web application are blocked by the web application for the computer or location displaying the same set of commonalities deemed to indicate a phishing attack and users can no longer log in from that computer or location. The system may also block all account changes for all users—even those not yet displaying the correlation—or for a group of specific users based on relationship. An example relationship might be if two users from one office or company have been phished, the whole office or company could be blocked from changes. The group could also be required to provide additional authentication, which may be out-of-band, such as dual factor authentication If the response to the query in step S107 is negative, the process proceeds to step S113, where changes to the account are withdrawn, and replaced by an earlier version of the account profile. This ensures that changes made to the account by the unauthorized user will not deny access to the authorized user. In addition to the communication in step S114, the process proceeds in parallel to step S115, where no changes are permitted to the account profile (e.g., not possible to unilaterally change the point of contact, or password). This prevents the phishing actor from commandeering the account, and preventing the authorized user from accessing the account. Subsequently, in Step S116, the process enhances the authentication procedure in one or more of a variety of ways such as requiring dual authentication, or a secondary confirmation through a separate device, verifying that the account owner is in fact the correct owner. The process then proceeds to step S117, where the computer 805 requires the user to change the password, and then in step S118 after the password has been changed the account is unlocked, and the profile changes are reset to permit normal authentication.

One of the significant advantages to this approach is that as soon as a pattern of phishing based attacks is detected, the system provides an extremely rapid and automated response to restrict the harm to only those account holders which may have been affected. This is far superior to a conventional approach of detecting a single compromised account and then requiring all users to change their account settings.

Figure 2:
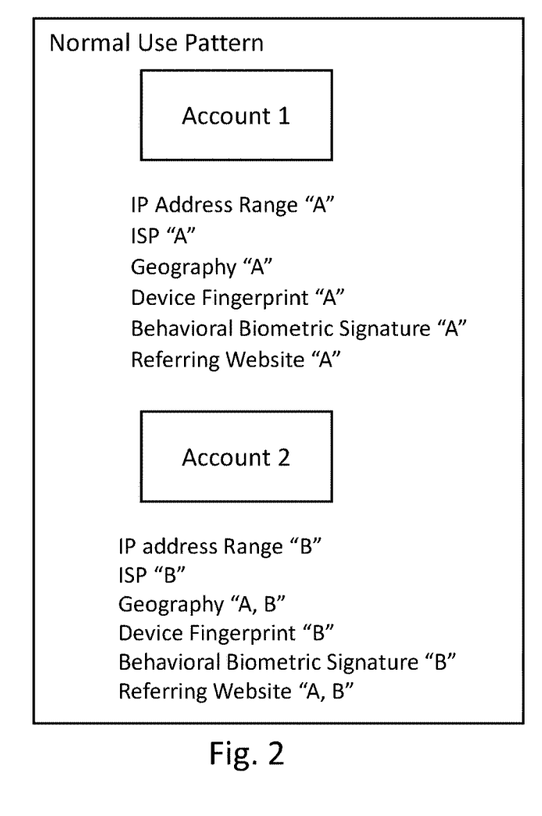
FIG. 2 is an illustration of data records held in a computer readable memory that are collected for a plurality of accounts and serve as a baseline profile-pattern of "normal use" according to the present disclosure.
Figure 3:
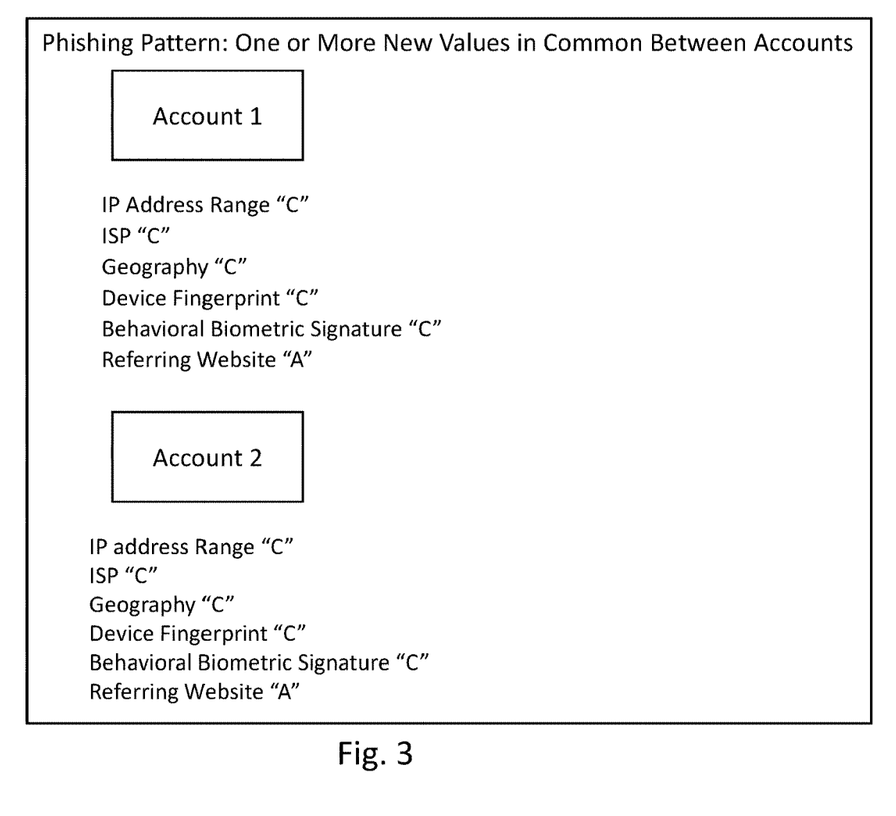
FIG. 3 is a similar illustration to FIG. 2 but includes changes in the baseline profile-pattern that are present in the plurality of accounts, but were not initially in common in the plurality of accounts.

FIGS. 2 and 3 are intended to be shown side-by-side to illustrate how a group of accounts that are subjected to phishing attacks from a common source can be detected via a pattern that shows uncharacteristically common profile features. FIG. 2 illustrates profile attributes of "Account 1" and "Account 2". The attributes include: IP Address Range; ISP; Geography; Device Fingerprint; Behavioral Biometric Signature; and Referring Website. In FIG. 2, the profile attributes of Account 1 all use the system letter "A" which is intended to represent a set "A" of appropriate attributes for the profile feature For example, the set of profile features "A" might be IP Address Range—e.g., 172.20.0.0 to 172.21.0.0; ISP—e.g. VERIZON FIOS; Geography—e.g., Virginia; Device Fingerprint—e.g., browser version, plugins, OS, fonts, etc.; Behavioral Biometric signature—e.g., keystroke dynamics, gait, mouse use characteristics, etc., and Referring Website—e.g., Corelogic.com.

Account 2 in FIG. 2 has a different set of profile features "B" but some of which may overlap with "A" and are thus represented in FIG. 2 as "A,B".

As compared with Account 1 and Account 2 in FIG. 2, Account 1 and Account 2 in FIG. 3 show the sets of profile features as being largely, or identically, the same. The sets of profile features in FIG. 3 occur later in time than the sets in FIG. 2. Except for a highly unusual reason, the sets of profile features in FIG. 3 should not be same for Accounts 1 and 2. Moreover, there is a likely reason for the similarity, and that is Accounts 1 and 2 have been the subject of a phishing attack, and a bad actor is using the information captured in the phishing attack to gain access to Accounts 1 and 2. When described herein, the term "commonality" is used to highlight the fact that different profile features for multiple accounts are now in common (FIG. 3), where before (FIG. 2) they were not. Thus, it can reasonably be inferred that something happened at the users' side to exhibit profile features that are highly correlated between multiple accounts, such as a common actor who is not trying to access both accounts.

Figure 4:
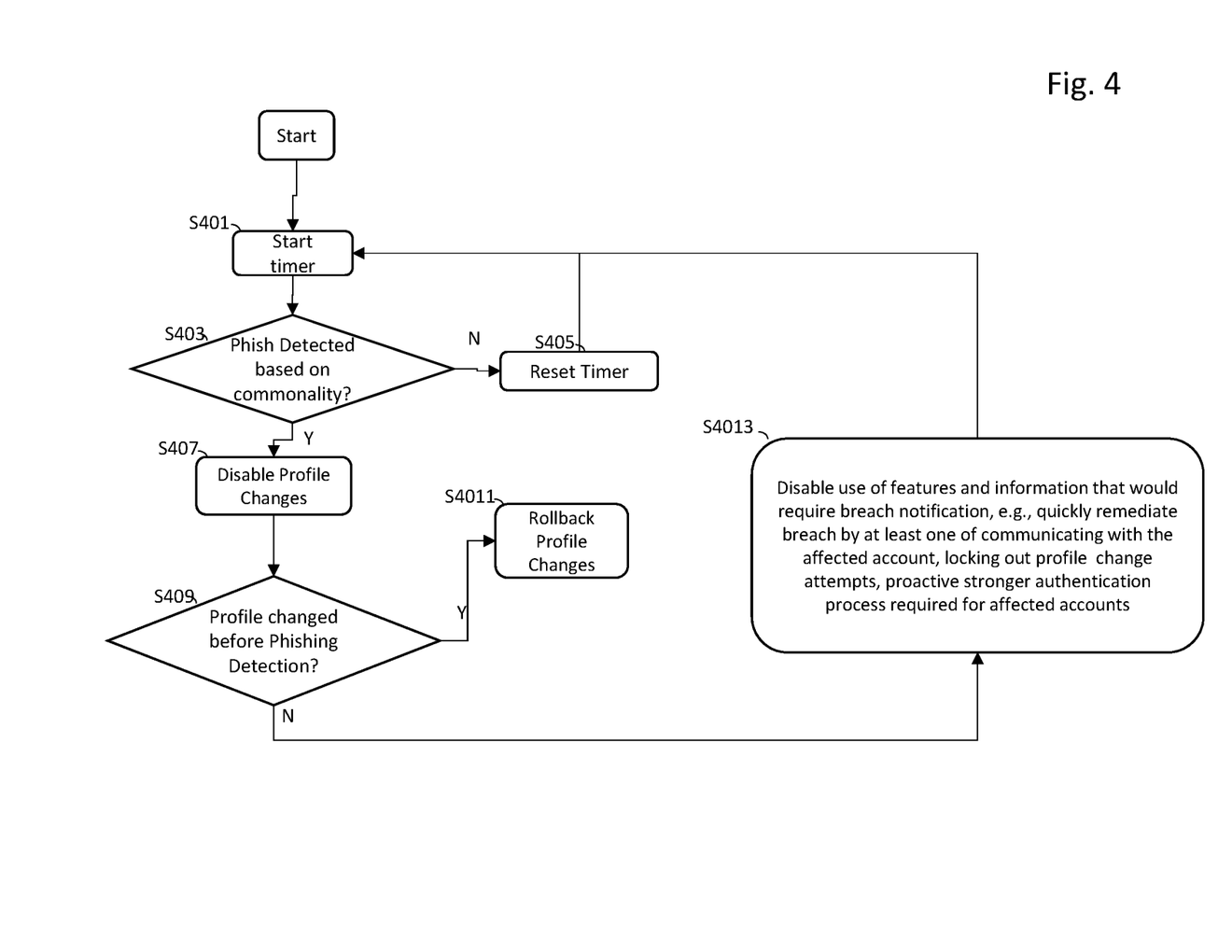
FIG. 4 is a flowchart of a process for limiting damage caused by a phishing related attack on an account by, among other things, disabling changes to a user's profile and reverting to the pre-attack profile.

FIG. 4 is a flowchart of a process flow executed by computer 805 to help limit the damage caused to multiple accounts as a consequence of having the logon credentials compromised in a phishing attack on the multiple accounts. In particular, the aim of the process in FIG. 4 is to react to changes in account profiles once a commonality is detected in multiple suspect accounts by limiting the ability of the back actor to do things like change passwords, and if the bad actor did make the change to the profile, "roll-back" the profile to a state prior to the phish detection.

The process of FIG. 4 begins in step S401 where a timer is set prior to performing a query in step S403 regarding whether a commonality was detected across multiple accounts as a consequence of phish activity. If the response to the inquiry in step S 405 is negative, the process returns to step S401. However, if the response to the inquiry in step S403 is affirmative, the process proceeds to step SS07 where the user is prevented from making any further profile changes. Subsequently, in step S409, another query is made regarding whether the profile had changed before the phishing attack was detected. If the response to the query is affirmative, the process proceeds to step S4011, where computer 805 rolls back the profile so as to remove the recent changes, and restore the profile features to the pre-phish attack profile. On the other hand, if the response to the inquiry in step S409 is negative, the process proceeds to step S4013, where the computer 805 disables the features and information that would require breach notification to the users. One example would be do proactively require stronger authentication for the suspect accounts, in addition to other optional steps such as communication with users of the affected accounts, and/or locking out attempts to change the profile.

Figure 5:
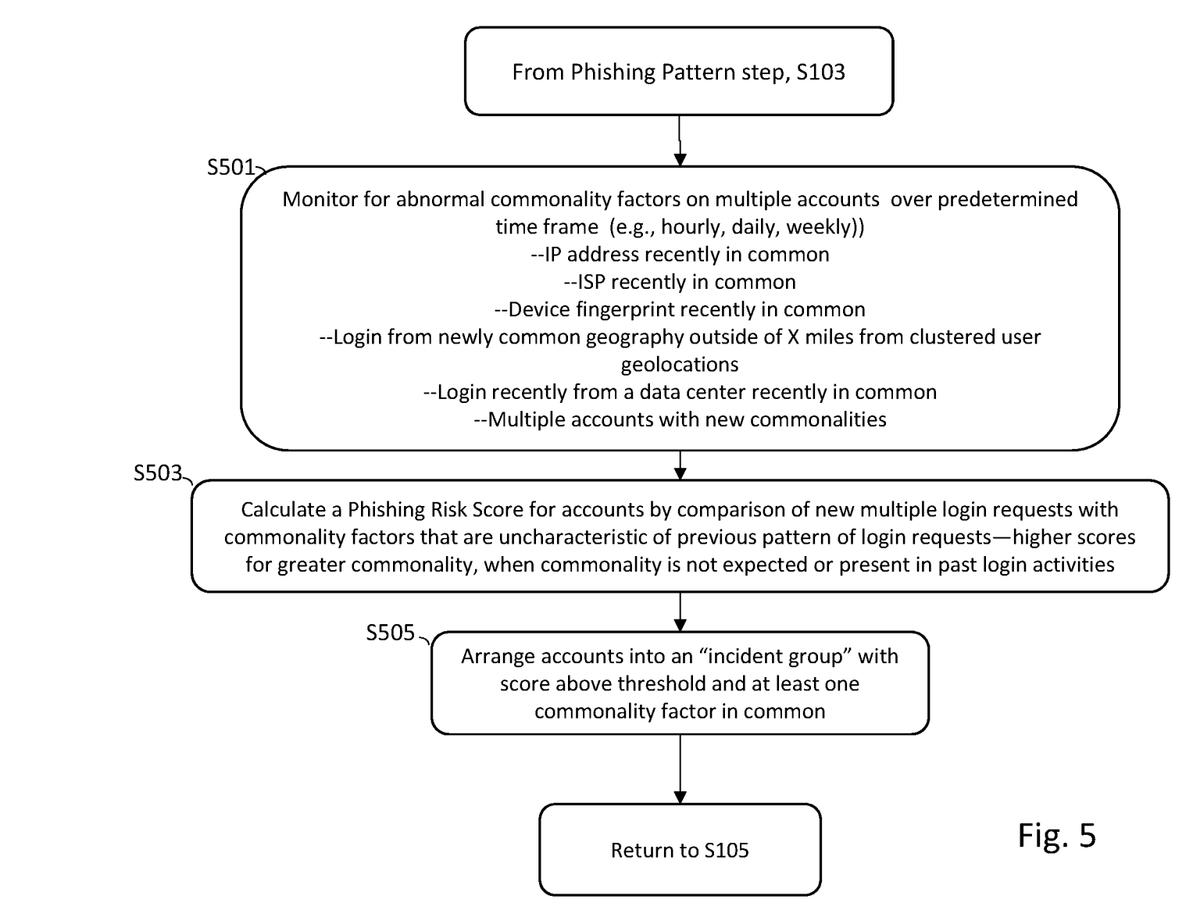
FIG. 5 is a flowchart of a more detailed process for detecting the phishing pattern step in FIG. 1 by, among other things, detecting an abnormal commonality of changes to login processes across multiple accounts.

FIG. 5 is a more detailed flowchart of the sub-steps used in step S103 regarding the detection of a phishing pattern. The process begins in step S501 where the computer 805 monitors for abnormal commonalities in the set of profile factors discussed with regard to FIGS. 2 and 3. The process then proceeds to Step S503, where a score is calculated (Phishing Risk Score) for accounts with (1) had a change in the set of profile features within a predetermined period of time (such as a minute, hour, or day). The process proceeds to step S503 where the commonality factors (FIGS. 2 and 3) are compared with one another, and summed. The highest commonality (all 6 factors in common) receives a score of 6, and the least commonality is a score of 1 (only one factor in common). Accounts are then grouped into different "incident groups" based on the commonality scores, step S505. The process then returns to step S105.

Figure 6:
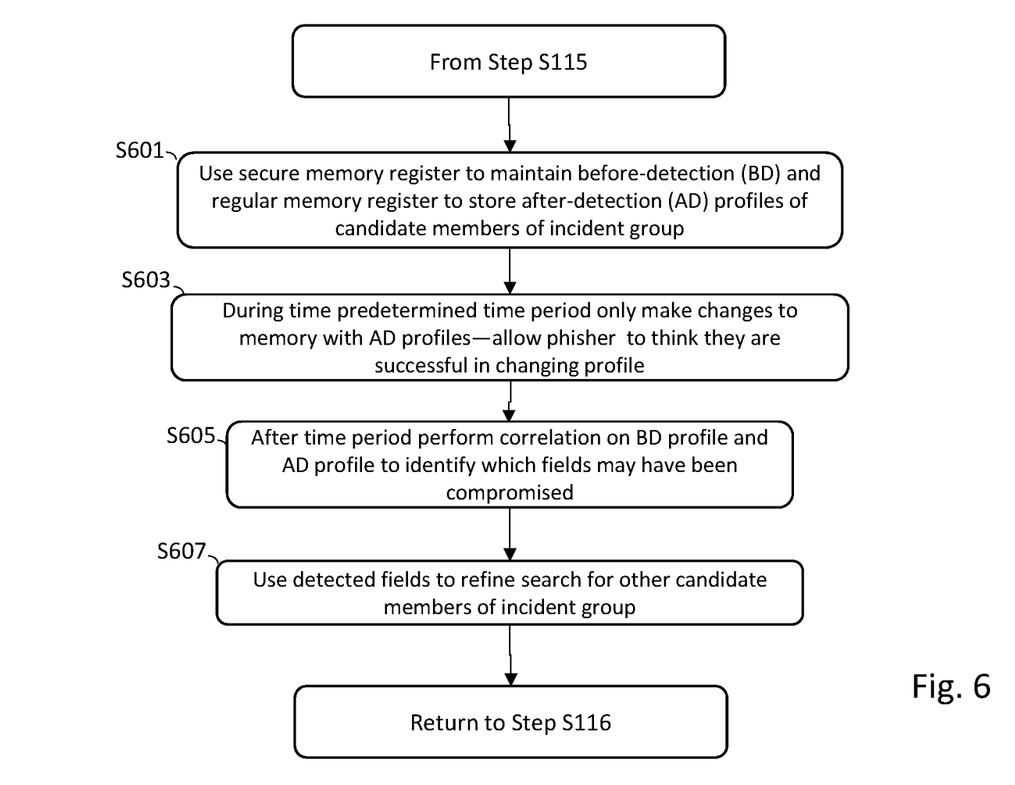
FIG. 6 is a flowchart of a process of using a secure memory register, which is inaccessible to users, to securely hold a user's profile while the user attempts to make other profile changes, and to restore the user's profile to an uncompromised state after the unauthorized attempt to change the profile was detected.

FIG. 6 is a flowchart of a process that exploits the benefits of using a secure memory register to maintain the profile of a user associated with an account. Users who use phishing to improperly gain access to other user accounts can be very sophisticated actors and may be able to change the profiles even after they are locked down by the computer 805. To help avoid this potential security breach, the process of FIG. 6 uses a dedicated secure memory register in the computer 805 that is inaccessible to a user. Accordingly, in step S601, the before-detection (BD) profiles are stored in the secure register as well as in the after-detection (AD) memory. The process then proceeds to step S603, where after a phishing attack is detected, the AD profile can be changed by a user, but not the BD profile because it is stored in the in the secure register. The process then proceeds to step S605 where after a predetermined period of time, e.g., 1 hour, the computer 805 performs a correlation (comparison) of the BD profile with the AD profile to identify which fields in the profile may have been compromised. The process then proceeds to step S607 where the detected fields are used to refine the search for other candidate members of the incident group which may have a common factor in their profile which has not yet been detected, but which may be evidence of a further account that was comprised as a result of a phishing attack.

The computer readable storage medium may be a tangible device that can store instructions for use by an instruction execution device (processor). The computer readable storage medium may be, for example, but is not limited to, an electronic storage device, a magnetic storage device, an optical storage device, an electromagnetic storage device, a semiconductor storage device, or any appropriate combination of these devices. A non-exhaustive list of more specific examples of the computer readable storage medium includes each of the following (and appropriate combinations): flexible disk, hard disk, solid-state drive (SSD), random access memory (RAM), read-only memory (ROM), erasable programmable read-only memory (EPROM or Flash), static random access memory (SRAM), compact disc (CD or CD-ROM), digital versatile disk (DVD) and memory card or stick. A computer readable storage medium, as used in this disclosure, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described in this disclosure can be downloaded to an appropriate computing or processing device from a computer readable storage medium or to an external computer or external storage device via a global network (i.e., the Internet), a local area network, a wide area network and/or a wireless network. The network may include copper transmission wires, optical communication fibers, wireless transmission, routers, firewalls, switches, gateway computers and/or edge servers. A network adapter card or network interface in each computing or processing device may receive computer readable program instructions from the network and forward the computer readable program instructions for storage in a computer readable storage medium within the computing or processing device.

Computer readable program instructions for carrying out operations of the present disclosure may include machine language instructions and/or microcode, which may be compiled or interpreted from source code written in any combination of one or more programming languages, including assembly language, Basic, Fortran, Java, Python, R, C, C++, C # or similar programming languages. The computer readable program instructions may execute entirely on a user's personal computer, notebook computer, tablet, or smartphone, entirely on a remote computer or compute server, or any combination of these computing devices. The remote computer or compute server may be connected to the user's device or devices through a computer network, including a local area network or a wide area network, or a global network (i.e., the Internet). In some embodiments, electronic circuitry including, for example, programmable logic circuitry, field-programmable gate arrays (FPGA), or programmable logic arrays (PLA) may execute the computer readable program instructions by using information from the computer readable program instructions to configure or customize the electronic circuitry, in order to perform aspects of the present disclosure.

Aspects of the present disclosure are described herein with reference to flow diagrams and block diagrams of methods, apparatus (systems), and computer program products according to embodiments of the disclosure. It will be understood by those skilled in the art that each block of the flow diagrams and block diagrams, and combinations of blocks in the flow diagrams and block diagrams, can be implemented by computer readable program instructions.

The computer readable program instructions that may implement the systems and methods described in this disclosure may be provided to one or more processors (and/or one or more cores within a processor) of a general purpose computer, special purpose computer, or other programmable apparatus to produce a machine, such that the instructions, which execute via the processor of the computer or other programmable apparatus, create a system for implementing the functions specified in the flow diagrams and block diagrams in the present disclosure. These computer readable program instructions may also be stored in a computer readable storage medium that can direct a computer, a programmable apparatus, and/or other devices to function in a particular manner, such that the computer readable storage medium having stored instructions is an article of manufacture including instructions which implement aspects of the functions specified in the flow diagrams and block diagrams in the present disclosure.

The computer readable program instructions may also be loaded onto a computer, other programmable apparatus, or other device to cause a series of operational steps to be performed on the computer, other programmable apparatus or other device to produce a computer implemented process, such that the instructions which execute on the computer, other programmable apparatus, or other device implement the functions specified in the flow diagrams and block diagrams in the present disclosure.

Figure 7:
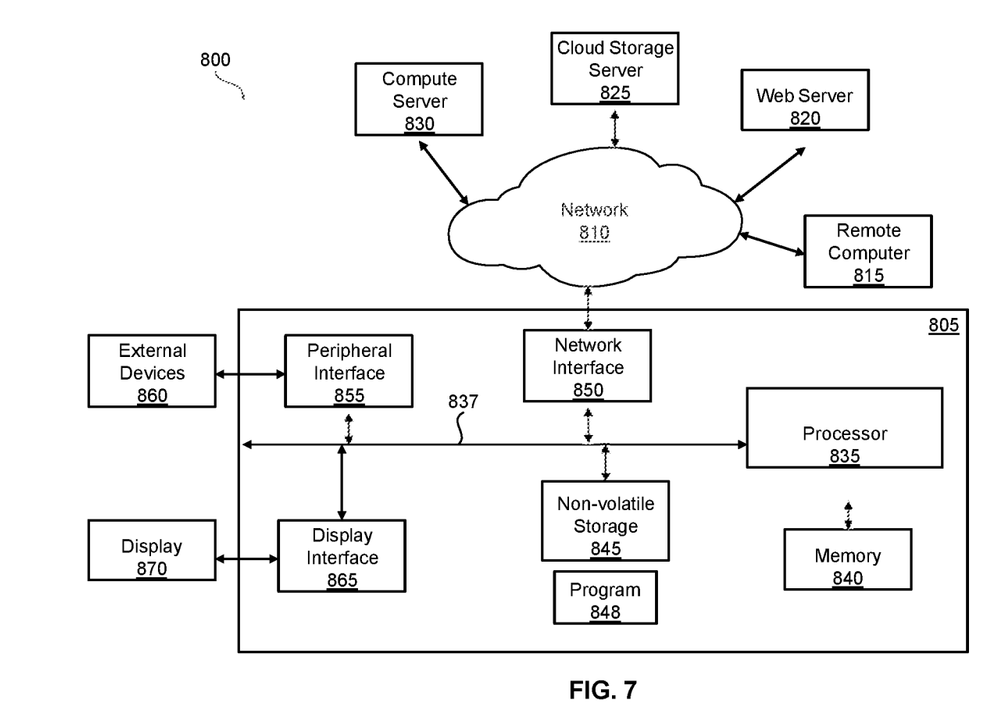
FIG. 7 is an exemplary hardware platform used to host the processes described herein.

FIG. 7 is a functional block diagram illustrating a networked system 800 of one or more networked computers and servers. In an embodiment, the hardware and software environment illustrated in FIG. 7 may provide an exemplary platform for implementation of the software and/or methods according to the present disclosure.

Referring to FIG. 7, a networked system 800 may include, but is not limited to, computer 805, network 810, remote computer 815, web server 820, cloud storage server 825 and compute server 830. In some embodiments, multiple instances of one or more of the functional blocks illustrated in FIG. 7 may be employed.

Additional detail of computer 805 is shown in FIG. 7. The functional blocks illustrated within computer 805 are provided only to establish exemplary functionality and are not intend to be exhaustive. And while details are not provided for remote computer 815, web server 820, cloud storage server 825 and compute server 830, these other computers and devices may include similar functionality to that shown for computer 805.

Computer 805 may be a personal computer (PC), a desktop computer, laptop computer, tablet computer, netbook computer, a personal digital assistant (PDA), a smart phone, or any other programmable electronic device capable of communicating with other devices on network 810.

Computer 805 may include processor 835, bus 837, memory 840, non-volatile storage 845, network interface 850, peripheral interface 855 and display interface 865. Each of these functions may be implemented, in some embodiments, as individual electronic subsystems (integrated circuit chip or combination of chips and associated devices), or, in other embodiments, some combination of functions may be implemented on a single chip (sometimes called a system on chip or SoC).

Processor 835 may be one or more single or multi-chip microprocessors, such as those designed and/or manufactured by Intel Corporation, Advanced Micro Devices, Inc. (AMD), Arm Holdings (Arm), Apple Computer, etc. Examples of microprocessors include Celeron, Pentium, Core i3, Core i5 and Core i7 from Intel Corporation; Opteron, Phenom, Athlon, Turion and Ryzen from AMD; and Cortex-A, Cortex-R and Cortex-M from Arm.

Bus 837 may be a proprietary or industry standard high-speed parallel or serial peripheral interconnect bus, such as ISA, PCI, PCI Express (PCI-e), AGP, and the like.

Memory 840 and non-volatile storage 845 may be computer-readable storage media. Memory 840 may include any suitable volatile storage devices such as Dynamic Random Access Memory (DRAM) and Static Random Access Memory (SRAM). Non-volatile storage 845 may include one or more of the following: flexible disk, hard disk, solid-state drive (SSD), read-only memory (ROM), erasable programmable read-only memory (EPROM or Flash), compact disc (CD or CD-ROM), digital versatile disk (DVD) and memory card or stick.

Program 848 may be a collection of machine readable instructions and/or data that is stored in non-volatile storage 845 and is used to create, manage and control certain software functions that are discussed in detail elsewhere in the present disclosure and illustrated in the drawings. In some embodiments, memory 840 may be considerably faster than non-volatile storage 845. In such embodiments, program 848 may be transferred from non-volatile storage 845 to memory 840 prior to execution by processor 835.

Computer 805 may be capable of communicating and interacting with other computers via network 810 through network interface 850. Network 810 may be, for example, a local area network (LAN), a wide area network (WAN) such as the Internet, or a combination of the two, and may include wired, wireless, or fiber optic connections. In general, network 810 can be any combination of connections and protocols that support communications between two or more computers and related devices.

Peripheral interface 855 may allow for input and output of data with other devices that may be connected locally with computer 805. For example, peripheral interface 855 may provide a connection to external devices 860. External devices 860 may include devices such as a keyboard, a mouse, a keypad, a touch screen, and/or other suitable input devices. External devices 860 may also include portable computer-readable storage media such as, for example, thumb drives, portable optical or magnetic disks, and memory cards. Software and data used to practice embodiments of the present disclosure, for example, program 848, may be stored on such portable computer-readable storage media. In such embodiments, software may be loaded onto non-volatile storage 845 or, alternatively, directly into memory 840 via peripheral interface 855. Peripheral interface 855 may use an industry standard connection, such as RS-232 or Universal Serial Bus (USB), to connect with external devices 860.

Display interface 865 may connect computer 805 to display 870. Display 870 may be used, in some embodiments, to present a command line or graphical user interface to a user of computer 805. Display interface 865 may connect to display 870 using one or more proprietary or industry standard connections, such as VGA, DVI, DisplayPort and HDMI.

As described above, network interface 850, provides for communications with other computing and storage systems or devices external to computer 805. Software programs and data discussed herein may be downloaded from, for example, remote computer 815, web server 820, cloud storage server 825 and compute server 830 to non-volatile storage 845 through network interface 850 and network 810. Furthermore, the systems and methods described in this disclosure may be executed by one or more computers connected to computer 805 through network interface 850 and network 810. For example, in some embodiments the systems and methods described in this disclosure may be executed by remote computer 815, computer server 830, or a combination of the interconnected computers on network 810.

Data, datasets and/or databases employed in embodiments of the systems and methods described in this disclosure may be stored and or downloaded from remote computer 815, web server 820, cloud storage server 825 and compute server 830.

Modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

To aid the Examiner and any readers of any patent issued on this application in interpreting the claims appended hereto, applicants wish to note that they do not intend any of the appended claims or claim elements to invoke 35 U.S.C. 112(f) unless the words "means for" or "step for" are explicitly used in the particular claim.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Obviously, numerous modifications and variations of the present invention are possible in light of the above teachings. It is therefore to be understood that within the scope of the appended claims, the invention may be practiced otherwise than as specifically described herein.

The invention claimed is:

1. A computer-implemented method of protecting user accounts potentially compromised by a common phishing attack based on logon activity in at least two accounts, comprising:

detecting a first device fingerprint and a first behavioral biometric signature of a first remote computer during a logon activity of the first remote computer using first logon credentials of a first account, of the at least two accounts, on an internet accessible access page of a hosted web application;

for a second account, of the at least two accounts, on the internet accessible access page of the hosted web application, the second account being different than the first account. detecting a second device fingerprint and a second behavioral biometric signature of a second computer during logon activity using second logon credentials that are different than the first logon credentials;

measuring a time difference between the logon activity of the first computer with respect to the logon activity of the second computer to determine whether the time difference is within a predetermined time period of logon activity in the at least two accounts as an indication whether the first logon credentials and the second logon credentials have been potentially compromised in a common phishing attack on the at least two accounts;

creating a pattern for a phishing detection event and storing the pattern in a secure storage medium along with at least one of the first logon credentials and the second logon credentials, the pattern including any difference between the first device fingerprint with respect to the second device fingerprint, as well as any difference between the first behavioral biometric signature and the second behavioral biometric signature;

determining the at least two accounts are part of the phishing detection event by matching and confirming that (1) the first device fingerprint matches the second device fingerprint, (2) the first behavioral biometric signature matches the second behavioral biometric signature, and (3) the time difference is within the predetermined time period of logon activity, and in response to determining the at least two accounts are part of the phishing detection event, blocking access to the at least two accounts of the hosted web application for any subsequent logon attempt to the first account with the first logon credentials and to the second account with the second logon credentials, and unblocking access to at least the first account after establishing a different authentication process for new logon credentials to access the first account, the different authentication process including an additional authentication step than an initial authentication process used to establish the first logon credentials for the first account.

2. The method of claim 1, further comprising:

in response to the confirming, performing a remedial step including locking out account profile changes to the at least two accounts.

3. The method of claim 2, wherein the blocking is performed in parallel with the remedial step.

4. The method of claim 3, wherein the blocking includes blocking attempted access to the hosted web application, an installed application, an API or an identity provider.

5. The method of claim 1, wherein the blocking includes blocking access when the logon attributes for the logon activity to each of the at least two accounts have the same IP address range,
internet service provider,
particular geographic range, and
referring website.

6. The method of claim 2, wherein the remedial step includes
blocking a change in any of the at least two accounts for any user or group of users having a predetermined relationship.

7. The method of claim 6, wherein the predetermined relationship includes at least one of
having a same employer,
having an e-mail address with a same domain name, or
being located in a same building.

8. The method of claim 6, wherein the predetermined relationship includes an account that was not identified in the step of confirming.

9. The method of claim 1, wherein,
the different authentication process includes out-of-band authentication.

10. The method of claim 1, wherein the confirming comprises
recording historic logon statistics in a storage medium, and
determining a phishing risk score by comparing recent logon requests that have been received before a first time with the historic logon statistics, wherein recent logon requests with logon statistics above the historic logon statistics by more than a predetermined amount have a higher phishing risk score than recent logon requests that are at or below the historic logon statistics.

11. The method of claim 10, wherein the historic logon statistics and logon statistics of recent logon requests include usage over a period of time of attempted access to the at least two accounts via a same IP address, data center IP address, or device fingerprint.

12. The method of claim 1, further comprising:
monitoring a request to change account profiles for at least one of the at least two accounts;
comparing whether a first time at which a request to change an initial account profile is received within a second time at which a phishing attack was confirmed on the at least one of the at least two accounts, and
in response to the first time being within the second time, rolling back a changed account profile to the initial account profile.

13. A non-transitory computer readable medium, having instructions stored therein that when executed by a processor perform a method of protecting user accounts potentially compromised by a common phishing attack based on logon activity in at least two accounts, the method comprising:
detecting a first device fingerprint and a first behavioral biometric signature of a first remote computer during a logon activity of the first remote computer using first logon credentials of a first account, of the at least two accounts, on an internet accessible access page of a hosted web application;
for a second account, of the at least two accounts, on the internet accessible access page of the hosted web application, the second account being different than the first account. detecting a second device fingerprint and a second behavioral biometric signature of a second computer during logon activity using second logon credentials that are different than the first logon credentials;
measuring a time difference between the logon activity of the first computer with respect to the logon activity of the second computer to determine whether the time difference is within a predetermined time period of logon activity in the at least two accounts as an indication whether the first logon credentials and the second logon credentials have been potentially compromised in a common phishing attack on the at least two accounts;
creating a pattern for a phishing detection event and storing the pattern in a secure storage medium along with at least one of the first logon credentials and the second logon credentials, the pattern including any difference between the first device fingerprint with respect to the second device fingerprint, as well as any difference between the first behavioral biometric signature and the second behavioral biometric signature;
determining the at least two accounts are part of the phishing detection event by matching and confirming that (1) the first device fingerprint matches the second device fingerprint, (2) the first behavioral biometric signature matches the second behavioral biometric signature, and (3) the time difference is within the predetermined time period of logon activity; and
in response to determining the at least two accounts are part of the phishing detection event, blocking access to the at least two accounts of the hosted web application for any subsequent logon attempt to the first account with the first logon credentials and to the second account with the second logon credentials, and unblocking access to at least the first account after establishing a different authentication process for new logon credentials to access the first account, the different authentication process including an additional authentication step than an initial authentication process used to establish the first logon credentials for the first account.

14. A system for protecting user accounts potentially compromised by a common phishing attack based on logon activity in at least two accounts, comprising:
a secure storage medium; and
circuitry configured to
detect a first device fingerprint and a first behavioral biometric signature of a first remote computer during a logon activity of the first remote computer using first logon credentials of a first account, of the at least two accounts, on an internet accessible access page of a hosted web application:
for a second account, of the at least two accounts, on the internet accessible access page of the hosted web application, the second account being different than the first account, detect a second device fingerprint and a second behavioral biometric signature of a second computer during logon activity using second logon credentials that are different than the first logon credentials;
measure a time difference between the logon activity of the first computer with respect to the logon activity of the second computer to determine whether the time difference is within a predetermined time period of logon activity in the at least two accounts as an indication whether the first logon credentials and the second logon credentials have been potentially compromised in a common phishing attack on the at least two accounts;
create a pattern for a phishing detection event and storing the pattern in the secure storage medium along with at least one of the first logon credentials and the second logon credentials, the pattern including any difference between the first device fingerprint with respect to the second device fingerprint, as well as any difference between the first behavioral biometric signature and the second behavioral biometric signature;

determine the at least two accounts are part of the phishing detection event by matching and confirm that (1) the first device fingerprint matches the second device fingerprint, (2) the first behavioral biometric signature matches the second behavioral biometric signature, and (3) the time difference is within the predetermined time period of logon activity; and in response to a determination that the at least two accounts are part of the phishing detection event, block access to the at least two accounts of the hosted web application for any subsequent logon attempt to the first account with the first logon credentials and to the second account with the second logon credentials, and unblock access to at least the first account after establishing a different authentication process for new logon credentials to access the first account, the different authentication process including an additional authentication step than an initial authentication process used to establish the first logon credentials for the first account.

15. The system of claim 14, wherein the circuitry is further configured to
  in response to confirmation, the circuitry is further configured to
  lock out account profile changes to the accounts.

16. The system of claim 15, wherein
  the circuitry is further configured to block access in parallel with blocking a change in any of the at least two accounts for any user or group of users having a predetermined relationship.

17. The system of claim 16, wherein the predetermined relationship includes at least one of
  having a same employer,
  having an e-mail address with a same domain name, or
  being located in a same building.

18. The system of claim 16, wherein the predetermined relationship includes an account that was not previously identified as being part of the phishing detection event.

19. The system of claim 14, wherein the circuity is further configured to deny access when the logon attributes for the logon activity to each of the at least two accounts have the same
  IP address range,
  internet service provider,
  particular geographic range, and
  referring website.

* * * * *